(12) United States Patent
Mishima et al.

(10) Patent No.: US 6,895,657 B2
(45) Date of Patent: May 24, 2005

(54) METHOD FOR PRODUCING A SLIDER FOR AN OPTICAL HEAD

(75) Inventors: Akio Mishima, Kanagawa (JP); Toru Katakura, Miyagi (JP)

(73) Assignee: Sony Corporation (JP)

( * ) Notice: Subject to any disclaimer, the term of this patent is extended or adjusted under 35 U.S.C. 154(b) by 301 days.

(21) Appl. No.: 10/251,773

(22) Filed: Sep. 23, 2002

(65) Prior Publication Data

US 2003/0016620 A1 Jan. 23, 2003

Related U.S. Application Data

(62) Division of application No. 09/782,274, filed on Feb. 14, 2001, now Pat. No. 6,781,950.

(30) Foreign Application Priority Data

Feb. 18, 2000 (JP) ..................................... P2000-046834

(51) Int. Cl.[7] ........................... G11B 5/127; H04R 31/00
(52) U.S. Cl. ............................... 29/603.07; 29/603.08; 29/603.12; 29/603.13; 29/603.15; 29/417; 216/62; 216/66; 205/119; 205/122; 427/127; 427/128; 360/234.6; 360/317
(58) Field of Search ........................ 29/603.08, 603.12, 29/603.13, 603.15, 417, 603.07; 360/234.6, 317; 205/119, 122; 216/62, 66; 427/127, 126

(56) References Cited

U.S. PATENT DOCUMENTS

| | | | | |
|---|---|---|---|---|
| 4,226,018 A | * | 10/1980 | Nakanishi et al. | ........ 29/603.12 |
| 5,124,961 A | | 6/1992 | Yamaguchi et al. | |
| 5,282,190 A | | 1/1994 | Maruo et al. | |
| 5,406,694 A | * | 4/1995 | Ruiz | ....................... 29/603.07 |
| 5,444,678 A | | 8/1995 | Ogata | |
| 5,722,156 A | * | 3/1998 | Balfrey et al. | ........... 29/603.08 |
| 5,872,683 A | | 2/1999 | Horiuchi | |
| 6,072,663 A | * | 6/2000 | Yokohata et al. | ........ 360/235.8 |
| 6,097,575 A | | 8/2000 | Trang et al. | |
| 6,130,863 A | | 10/2000 | Wang et al. | |
| 6,167,016 A | | 12/2000 | Block et al. | |
| 6,181,673 B1 | | 1/2001 | Wilde et al. | |

FOREIGN PATENT DOCUMENTS

| | | | | |
|---|---|---|---|---|
| JP | 03034110 A | * | 2/1991 | ............ G11B/5/31 |
| JP | 11220347 A | * | 8/1999 | ............ H03H/3/02 |

OTHER PUBLICATIONS

"Slider–disk interaction and its effect on the flying performance of slider"; Yao–Long Zhu; Bo Liu; Ying–Hui Li; Qing–Fang Leng; Magnetics, IEEE Transactions on , vol.: 35 , Issue: 5 , Sep. 1999 pp.:2403–2405.*

* cited by examiner

Primary Examiner—A. Dexter Tugbang
Assistant Examiner—Paul D Kim
(74) Attorney, Agent, or Firm—Ronald P. Kananen; Rader, Fishman & Grauer PLLC (57) ABSTRACT

A method for producing a slider for an optical head includes a slider member adapted for floating and running over a recording medium during recording and/or reproduction of information signals for the recording medium. An optical lens is bonded to the slider member and a magnetic field generator provided on a surface of the slider member carrying the optical lens facing the recording medium. A first step is forming a groove presenting a bottom surface inclined in the depth-wise direction by ejecting a polishing agent dispersed in a compressed gas on a substrate. A second step is charging an electrically conductive material, which proves a terminal electrically connected to the magnetic field generator in the inside of the groove formed in the substrate. A third step is cutting the substrate in the vicinity of an end of the groove to form a plurality of individual slider members.

3 Claims, 9 Drawing Sheets

METHOD FOR PRODUCING A SLIDER FOR AN OPTICAL HEAD

This application is a divisional application Ser. No. 09/782,274; filed Feb. 14, 2001 now U.S. Pat. No. 6,781,950.

BACKGROUND OF THE INVENTION

1. Field of the Invention

This invention relates to a slider member for an optical recording head adapted for recording and/or reproducing signals on or from a recording medium, such as an optical disc, a method for producing the slider member, and a recording and/or reproducing apparatus for recording and/or reproducing signals on or from a recording medium by an optical head employing such optical head.

2. Description of Related Art

An optical disc for recording and/or reproducing signals by illuminating light on a signal recording surface, such as a magneto-optical disc or a phase-change disc, is now in widespread use. In such optical disc, attempts are now being made in increasing the recording density by reducing the light spot diameter on the signal recording surface of the optical disc with a view to increasing the volume of the recordable information to the maximum extent possible.

In keeping up with the increasing recording density for the optical disc, attempts are also being made for reducing the spot diameter of the light illuminated on the signal recording surface of the optical disc to increase the recording density in an optical pickup configured for recording and/or reproducing signals on or from an optical disc.

Recently, it has been proposed to construct a slider member for an optical head carrying an optical lens, by utilizing the technique of the floating head slider in e.g., a hard disc device, and to collect and illuminate light on the signal recording surface of the optical disc by the optical lens loaded on the slider member to record and/or reproduce the signals, as the slider member is floated a pre-set amount above the signal recording surface.

If such slider member for the optical head is used in the optical disc device, the distance between the optical lens and the signal recording surface of the optical disc can be reduced significantly as compared to that when the light is illuminated on the signal recording surface of the optical disc from an optical head not provided with the slider member for the optical head. This enables the high NA lens to be used to reduce the spot diameter of the light illuminated on the signal recording surface of the optical disc.

If, in this optical disc device, a magneto-optical disc is to be used, magnetic field generating means needs to be provided for applying a magnetic field to the magneto-optical disc.

This magnetic field generating means may be provided separately from the above-mentioned slider member for the optical head. However, for reducing the size or simplifying the structure of the optical disc device, this slider member for the optical head is desirably provided as one with the slider member for the optical head. In such case, the magnetic field generating means is formed e.g., by a thin film coil embedded in a surface of the slider member facing the magneto-optical disc, and is mounted for encircling the focal point of the laser beam.

Figure 1:
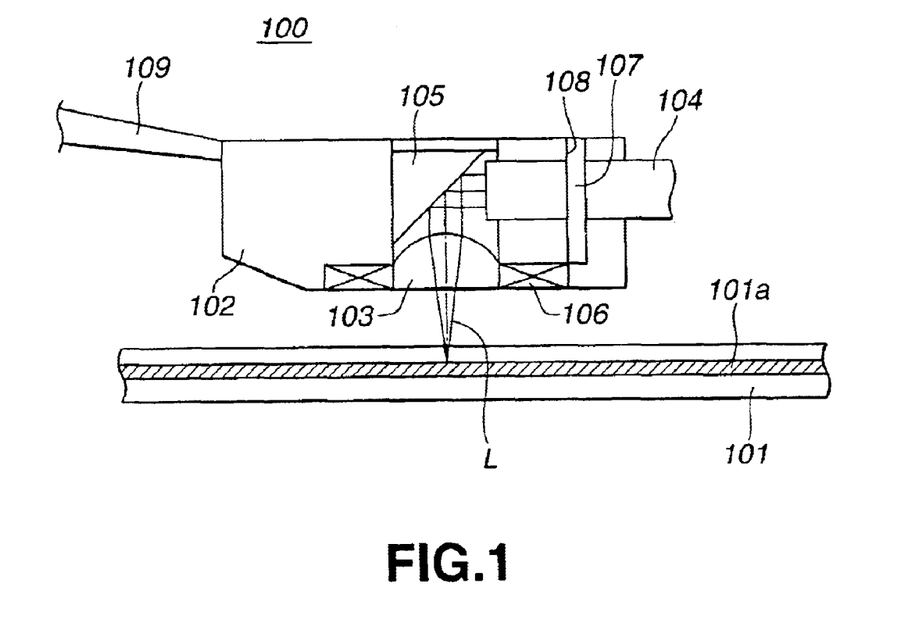
FIG. 1 is a longitudinal cross-sectional view for illustrating the structure of a conventional slider for an optical head.

FIG. 1 shows a typical structure of the slider for the optical head. A slider for the optical head 100, shown in FIG. 1, includes a slider member 102, adapted for floating and running over a magneto-optical disc 101 during signal recording and/or reproduction on or from the magneto-optical disc 101, and an optical lens 103 joined to the slider member 102. An optical fiber 104 and a polarizing mirror 105 are built into the slider member 102. A light beam L, guided by the optical fiber 104, is incident on and collected by the optical lens 103 through the polarizing mirror 105. The laser beam L, collected by the optical lens 103, is illuminated on a signal recording layer 101a of the magneto-optical disc 101.

This slider member 102 includes a thin-film coil 106 for applying a magnetic field across the magneto-optical disc 101 during recording and a terminal 107 electrically connected to this thin-film coil 106. The thin-film coil 106 is formed on the surface of the slider member 102 facing the magneto-optical disc 101 by being coiled around the optical lens 103. On the other hand, the terminal 107 is formed by an electrically conductive material being charged in a through-hole bored in the slider member 102 along its thickness to a position of an abutment with the thin-film coil 106.

The slider member 102 is mounted on the distal end of a supporting arm 109 provided in the optical disc device to scan the magneto-optical disc 101 as the disc is run in rotation. The slider member 102 is also moved along the radius of the magneto-optical disc 101 as the supporting arm 109 is rotated.

A slider for the optical head 100, described above, is floated over the magneto-optical disc 101 a pre-set amount under an air stream produced on rotation of the magneto-optical disc 101. The slider for the optical head 100, thus floated, illuminates a laser beam L, collected by the optical lens 103 loaded on the slider member 102, on the signal recording layer 101a of the magneto-optical disc 101. Signal recording and/or reproduction on or from the magneto-optical disc 101 is achieved by illuminating the laser beam L on the signal recording layer 101a.

During recording, the thin-film coil 106 generates a magnetic field of a pre-set strength. This magnetic field is applied to the location of the signal recording layer 101a of the magneto-optical disc 101 illuminated by the laser beam L.

Meanwhile, in this slider for the optical head 100, the through-hole 108 is bored through the slider member 102 along its thickness to a position of abutment against the thin-film coil 106, as described above, and the electrically conductive material is charged into this through-hole 108 to form the terminal 107 electrically connected to the thin-film coil 106.

However, since a variety of optical components, such as optical fiber 104 or the polarizing mirror 105, are built into the slider member 102, it becomes increasingly difficult to form the through-hole 108 in the slider member 102 for burying the above-mentioned terminal 107 as the slider for the optical head 100 becomes smaller in size.

Moreover, in forming the through-hole 108, the slider member 102 is subjected to punching using a diamond drill or an ultrasonic machining device. However, since this necessitates extremely fine working, defects termed chipping tend to be produced in the through-hole 108 formed, or the through-hole 108 sometimes cannot be formed to high precision at the intended location in the slider member 102.

SUMMARY OF THE INVENTION

It is therefore an object of the present invention to overcome the above-mentioned drawback of the prior art and to provide a slider for an optical head which permits proper signal recording and/or reproduction on or from a recording medium, even if the slider for the optical head is of a small size, and which is easy to manufacture and high in operational reliability.

It is another object of the present invention to provide a method for producing a slider for the optical head which enables the slider for the optical head to be manufactured easily and to high accuracy.

It is yet another object of the present invention to provide a recording and/or reproducing apparatus having an optical head employing the slider for the optical head.

In one aspect, the present invention provides a slider for an optical head including a slider member adapted for floating and running over a recording medium during recording and/or reproduction of information signals for the recording medium, an optical lens bonded to the slider member and magnetic field generating means provided on a surface of the slider member carrying the optical lens facing the recording medium. The slider member is formed with a terminal groove opened in a surface thereof facing the recording medium and in a lateral surface thereof, with an electrically conductive material being charged in the terminal groove. The electrically conductive material charged forms a terminal electrically connected to the magnetic field generating means, with one end of the terminal facing to outside of the slider member from a lateral surface of the slider member.

In this slider for the optical head, the terminal electrically connected to the magnetic field generating means is formed by charging an electrically conductive material in the inside of a terminal groove opened in a surface of the slider member facing the recording medium and in its lateral surface so that one end of the terminal faces to outside the slider member to facilitate the manufacture as well as to realize a small size of the slider.

In another aspect, the present invention provides a method for producing a slider for an optical head including a slider member adapted for floating and running over a recording medium during recording and/or reproduction of information signals for the recording medium, an optical lens bonded to the slider member and magnetic field generating means provided on a surface of the slider member carrying the optical lens facing the recording medium, in which the method includes a first step of forming a groove presenting a bottom surface inclined in the depth-wise direction by ejecting a jet comprised of a polishing agent dispersed in a compressed gas on a substrate which proves the slider member, a second step of charging an electrically conductive material, which proves a terminal electrically connected to the magnetic field generating means, in the inside of the groove formed in the substrate and a third step of cutting the substrate in the vicinity of an end of the groove to form a plurality of individual slider members.

In this method for producing the slider for the optical head, the terminal groove is formed in the slider member so as to be opened in the surface of the slider member facing the recording medium and in its lateral surface, and the electrically conductive material is charged into the terminal groove, whereby a number of sliders for the optical head, each provided with terminals electrically connected to the magnetic field generating means and having one ends facing to outside of the slider member from its lateral side, may be produced in a lump in large quantities.

That is, if the slider for the optical head is produced by the above-described process, small-sized sliders for an optical head having stable quality can be produced in a lump in large quantities, thus reducing the manufacturing cost.

In a further aspect, the present invention provides a recording and/or reproducing apparatus having an optical head for signal recording and/or reproduction on or from a recording medium, the optical head having a head slider for scanning on the recording medium being run in rotation and a supporting arm for supporting the head slider, the head slider including a slider member for floating and running over the recording medium during signal recording and/or reproduction on or from a recording medium, and an optical lens bonded to the slider member and magnetic field generating means provided on a surface of the slider member carrying the optical lens facing the recording medium. The slider member is formed with a terminal groove opened in a surface thereof facing the recording medium and in a lateral surface thereof, with an electrically conductive material being charged in the terminal groove. The electrically conductive material charged forms a terminal electrically connected to the magnetic field generating means, with one end of the terminal facing to outside of the slider member from a lateral surface of the slider member.

Since this recording and/or reproducing apparatus includes a head slider formed with a terminal groove in the surface of a slider member facing the recording medium and in the lateral surface of the slider member, and an electrically conductive material is charged into this terminal groove to form a terminal, which is electrically connected to the magnetic field generating means, and one end of which faces to outside of the slider member from the lateral surface of the slider member, signal recording and/or reproduction for the recording medium can be achieved satisfactorily even if the head slider is reduced in size.

In the slider for the optical head according to the present invention, as described above, the terminal electrically connected to the magnetic field generating means is formed by charging an electrically conductive material in the terminal groove opening in the surface of the slider member facing the recording medium and in the lateral side of the slider member, so that its one end faces to outside the slider member from the lateral surface of the slider member to provide a structure easy to fabricate and small in size.

According to the method for producing a slider for the optical head of the present invention, a number of sliders for an optical head, provided with terminals electrically connected to the magnetic field generating means and having one end facing to outside the slider member from the lateral surface of the slider member, can be fabricated in a lump by forming a terminal groove opening in a surface of the slider member facing the recording medium and in a lateral surface of the slider member and by charging an electrically conductive material within this terminal groove.

That is, by preparing the slider for an optical head by the above-described step of operations, small-sized sliders for the optical head can be manufactured to high precision by a simplified method. Moreover, by this manufacturing method, the sliders for an optical head with stable quality can be produced in a lump in larger quantities, thus reducing the manufacturing cost.

In addition, in the recording and/or reproducing apparatus according to the present invention, in which the terminal groove is formed in the slider member so as to be opened in the surface of the slider member facing the recording medium and in the lateral surface of the slider member, and the electrically conductive material is charged into this terminal groove, the head slider is provided with a terminal electrically connected to magnetic field generating means and which has one end facing to outside the slider member from the lateral surface of the slider member, whereby signals can be recorded and/or reproduced on or from the recording medium even if the slider member is miniaturized in size.

In the slider for the optical head according to the present invention, as described above, the terminal electrically connected to the magnetic field generating means is formed by charging the electrically conductive material in the terminal groove opening in the surface of the slider facing the recording medium and in its lateral surface, so that its one end faces to outside the slider member, thus assuring facilitated production and a small size of the slider.

Moreover, in the method for producing the slider for the optical head, according to the present invention, in which a terminal groove is formed in the surface of the slider facing the recording medium and in its lateral surface, and the electrically conductive material is charged into this terminal groove, plural sliders for an optical head, having terminals electrically connected to magnetic field generating means and having one ends facing to outside the slider member from the lateral surface of the slider member, can be manufactures in a lump in larger quantities.

DESCRIPTION OF THE PREFERRED EMBODIMENTS

Referring to the drawings, preferred embodiments of according to the present invention will be explained in detail.

Figure 2:
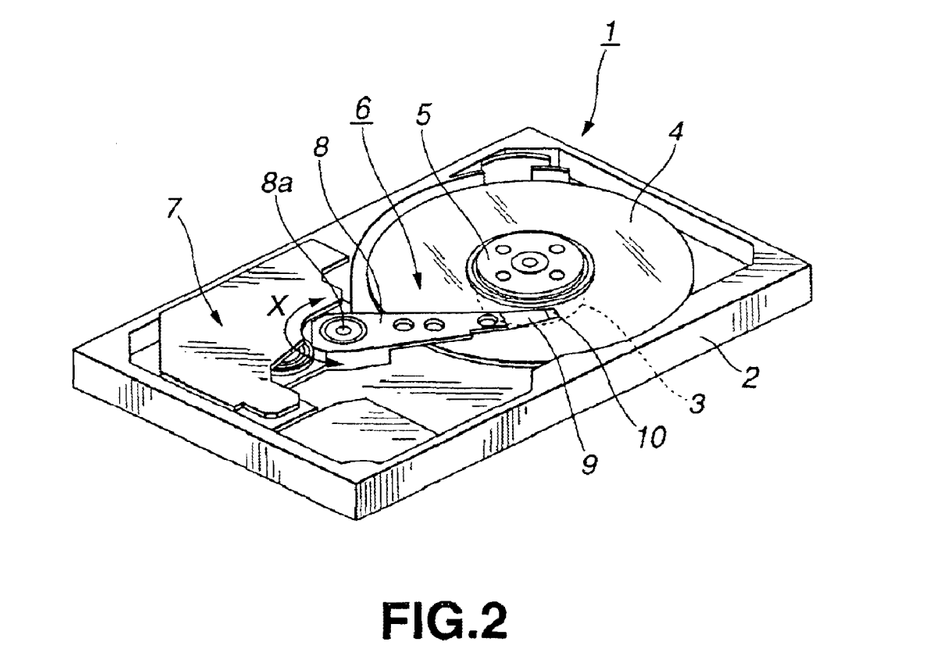
FIG. 2 is a schematic perspective view showing a typical optical disc device according to the present invention.

FIG. 2 shows an embodiment of an optical disc device according to the present invention. The optical disc device 1, shown in FIG. 2, represents the application of a hard disc device technique used in a storage device in e.g., a personal computer. A spindle motor 3 provided within a casing 2 mounts a magneto-optical disc 4 for recording and/or reproducing signals and is secured by a clamper 5. The magneto-optical disc 4 is run in rotation at a pre-set rpm with rotation of the spindle motor 3 controlled for driving by a control circuit, not shown.

Within the casing 2, there is mounted an optical head device 6 in place of a magnetic head device used in a hard disc device. This optical head device 6 records and/or reproduces signals on or from the magneto-optical disc 4 run in rotation by the spindle motor 3. This optical head device 6 includes an arm 8, rotationally driven by the spindle motor 3, a head supporting spring 9, formed integrally with the arm 8 and a head slider 10 mounted on the distal end of the head supporting spring 9.

A voice coil motor 7 is made up of a voice coil mounted on the arm 8 and a pair of magnets arranged for sandwiching the voice coil in-between. In this voice coil motor 7, the current is supplied to the voice coil from outside to generate a driving force by the current flowing through the voice coil and the magnetic field of a magnet, not shown, so that the arm 8 and the head supporting spring 9 are run in rotation in the direction indicated by arrow X in FIG. 2, about a pivot 8a as center.

In this optical head device 6, the arm 8 and the head supporting spring 9 are run in rotation by the driving of the voice coil motor 7, whereby the head slider 10 mounted on the distal end of the head supporting spring 9 is moved in a direction along the radius of the magneto-optical disc 4 which is run in rotation by the spindle motor 3. The head slider 10 mounted on the distal end of the head supporting spring 9 scans the magneto-optical disc 4, as the head slider 10 is floated at a pre-set floating amount above the magneto-optical disc 4 under an air stream generated with rotation of the magneto-optical disc 4.

Figure 3:
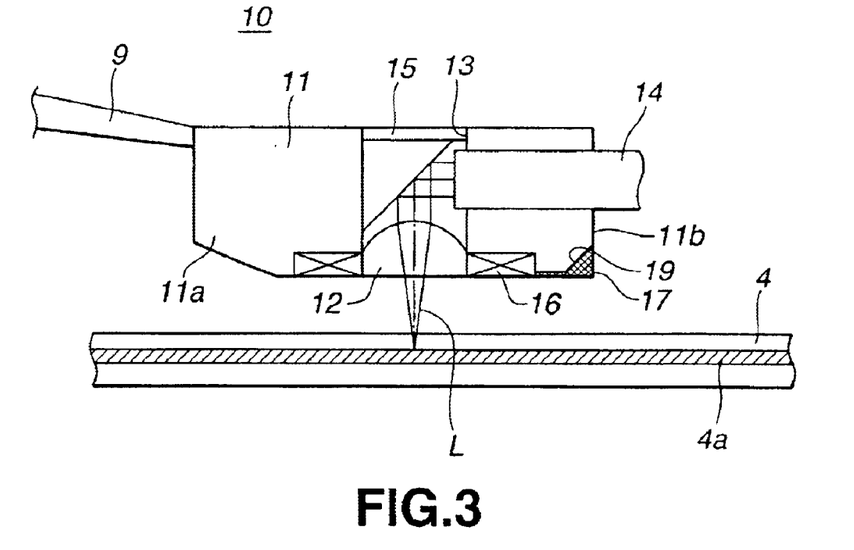
FIG. 3 is a longitudinal cross-sectional view showing the structure of a head slider provided on the optical disc device.

FIG. 3 shows an embodiment of the head slider 10 provided on the optical head device 6.

The head slider 10 is designed for use on the optical head according to the present invention, and includes a slider member 11, run with floating over the signal recording surface of the magneto-optical disc 4 during signal recording and/or reproduction on or from the magneto-optical disc 4, and an optical lens 12 joined to the slider member 11.

The slider member 11, formed of a material such as Altic (Al2O3-Tic), is molded substantially to a rectangular profile, and is supported on the distal end of the head supporting spring 9 for facing the magneto-optical disc 4. The slider member 11 has, on its surface 11a facing the magneto-optical disc 4, an air lubricating surface for producing a force of float by an air stream generated with rotation of the magneto-optical disc 4. There is no particular limitation to the shape of the air lubricating surface which may be designed to any suitable optional profile.

This slider member 11 includes a through-hole 13 extending along its thickness. This through-hole 13 has a diameter approximately equal to the outer diameter of the optical lens 12.

The optical lens 12 collects the laser beam L for illumination on the signal recording layer 4a of the magneto-optical disc 4 from its signal recording surface during signal recording and/or reproduction on or from the magneto-optical disc 4. The optical lens 12 is substantially semi-spherical in profile and is formed of a high refractive index material having sufficiently high light transmittance in the wavelength range of the laser beam L, such as optical glass or optical plastics. This optical lens 12 is bonded to the wall peripheral section of the through-hole 13 formed in the slider member 11, with a portion of the lateral surface thereof as a bonding surface, so as to be bonded unitarily to the slider member 11.

The slider member 11 also has built therein an optical fiber 14 and a polarizing mirror 15 for routing the laser beam L, radiated from a semiconductor laser, not shown, provided in the optical head device 6, towards the optical lens 12. The optical fiber 14 has its one end protruded from the lateral surface of the slider member 11 into the inside of the through-hole 13. The polarizing mirror 15 is located within the through-hole 13 of the slider member 11 on an optical path between the optical fiber 14 and the optical lens 12.

Thus, in this head slider 10, the laser beam L, routed by the optical fiber 14, is incident through the polarizing mirror 15 on the optical lens 12 and is collected thereby so as to be illuminated on the signal recording surface 4a of the magneto-optical disc 4.

Figure 4A:
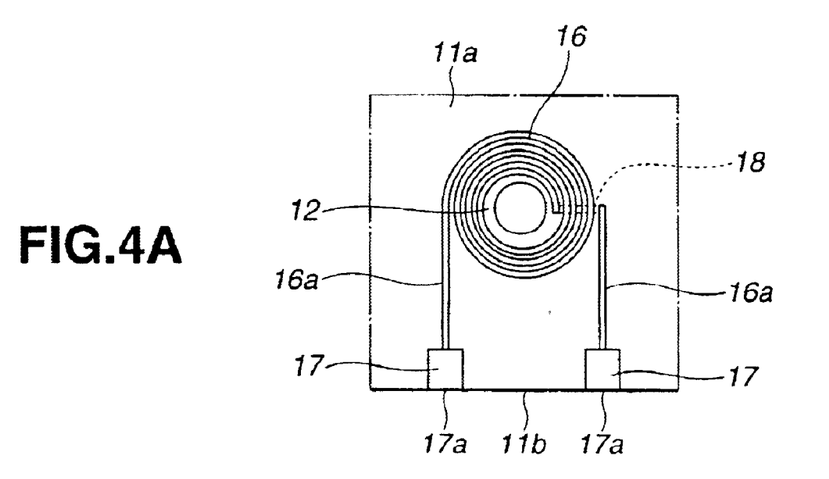
FIGS. 4A and 4B show a slider member forming the head slider, FIG. 4A being a schematic plan view looking from the surface of the slider member facing the magneto-optical disc and FIG. 4B being a schematic side view looking from the end of the slider member towards the air effluent side of the air stream produced on rotation of the magneto-optical disc.
Figure 4B:
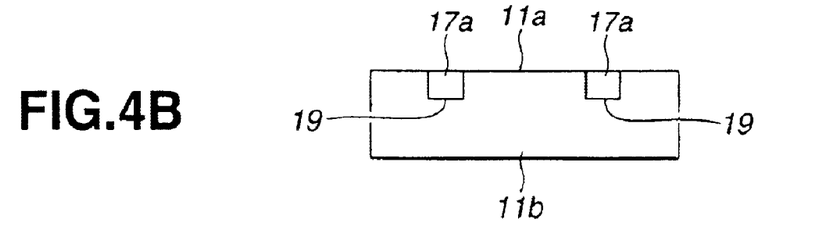

The slider member 11 is also provided with a thin-film coil 16 for applying a magnetic field to the magneto-optical disc 4 during recording and terminals for connection to outside 17, electrically connected to this thin-film coil 16, as shown in FIGS. 3, 4A and 4B. Meanwhile, FIG. 4A is a schematic plan view looking from a face 11a of the slider member 11 facing the magneto-optical disc 4 and FIG. 4B is a schematic plan view looking from an end on the effluent side of the air stream generated with rotation of the magneto-optical disc 4 of the slider member 11.

The thin-film coil 16 is formed as a thin film wrapped around the optical lens 12 on the surface 11a of the slider member 11 facing the magneto-optical disc 4. The thin-film coil 16 has its inner rim side end led to the outer rim side via a lead-out conductor 18, and includes a lead-out portion 16a for leading out the lead-out conductor 18 and an outer rim side end of the thin-film coil 16 towards the air stream effluent side of the slider member 11. Ths lead-out portion 16a is connected to the terminals for connection to outside 17.

The terminals for connection to outside 17 are electrically connected to the thin-film coil 16 via the lead-out portion 16a and are formed so that ends 17a face the outside of the slider member 11 from a lateral surface 11b of the slider member 11. That is, terminal for connection to outside 17 is formed by charging an electrically conductive material within a terminal groove 19 formed in the slider member 11 so as to be opened to the surface 11a facing the magneto-optical disc 4 and to a lateral surface 11b. The terminal groove 19 has its bottom surface inclined so that its bottom surface will be deeper from the surface 11a of the slider member 11 facing the magneto-optical disc 4 towards the lateral surface 11b.

Figure 5:
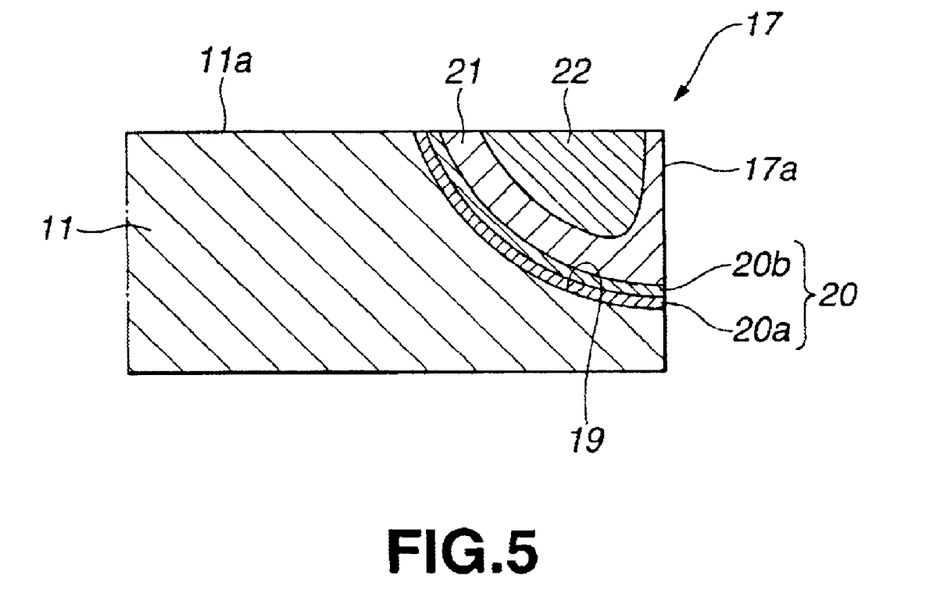
FIG. 5 is a schematic cross-sectional view showing a typical terminal for connection to outside.

Referring to FIG. 5, showing a more specified structure of the terminal for connection to outside 17, chromium 20a and copper 20b, both being electrically conductive materials, are sequentially deposited as an underlying layer 20 within the terminal groove 19. On this underlying layer 20 are sequentially deposited gold 21 and copper 22, as electrically conductive materials, to form a multi-layered structure, with the gold 21 being deposited to face to outside of the slider member 11 from its lateral surface 11b. That is, the portion of the terminal for connection to outside 17 formed of the gold 21 is exposed at an end 17a of the terminal for connection to outside 17. To the terminal 17a of the terminal for connection to outside 17 is connected a wire similarly formed of gold by e.g., wire bonding, whereby the current may be furnished from outside for generating the magnetic field to the thin-film coil 16.

Figure 6:
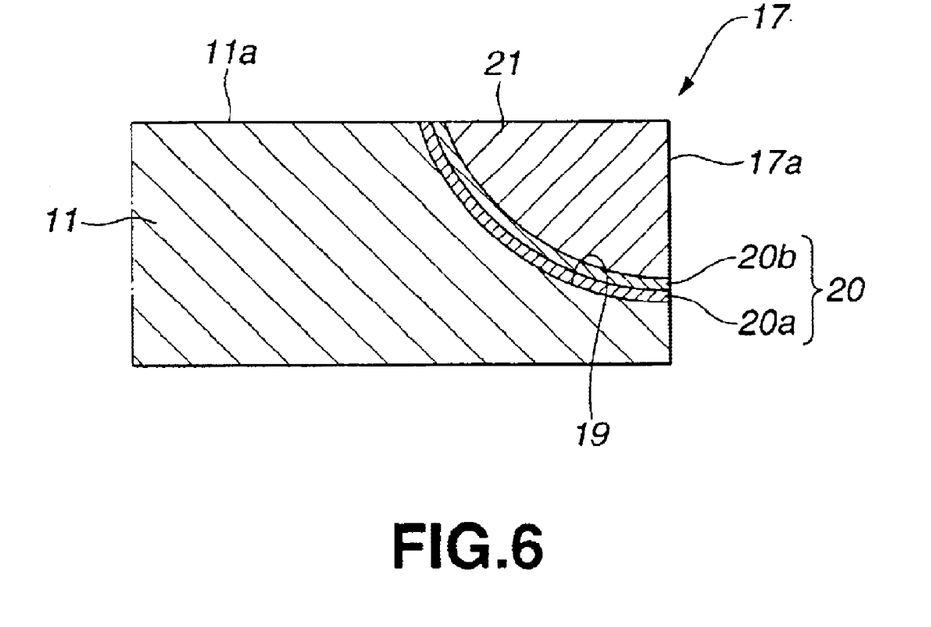
FIG. 6 is a schematic cross-sectional view showing another typical terminal for connection to outside.

Although the terminal for connection to outside 17 is of a multi-layered structure of metal and other metals, this structure necessarily is not imitative of the present invention. For example, such a structure may be used in which only the gold 21 is deposited on the underlying layer 20 formed by sequentially layering chromium 20a and copper 20b, as shown in FIG. 6.

In the head slider 10, a protective film may also be formed on the surfaces of the thin-film coil 16 and the terminals for connection to outside 17 to protect the thin-film coil 16 and the terminals for connection to outside 17.

The head slider 10, constructed as described above, is subjected to an air stream produced on rotation of the magneto-optical disc 4 and is floated with a pre-set float amount over the signal recording surface of the magneto-optical disc 4. In this state, the laser beam L, collected by the optical lens 12 loaded on the slider member 11, is illuminated on the signal recording surface 4a of the magneto-optical disc 4 to record and/or reproduce signal on or from the magneto-optical disc 4. During recording, a magnetic field of a pre-set intensity is generated by the thin-film coil 16 and applied to the location of the signal recording layer 4a f the magneto-optical disc 4 illuminated by the laser beam L.

In this head slider 10, the electrically conductive material is charged into the inside of the terminal groove 19 formed in the slider member 11 by being opened in the surface 11a facing the magneto-optical disc 4 and in the lateral surface 11b to interconnect the terminal for connection to outside 17 to the thin-film coil 16 via lead-out portion 16a, with the end 17a facing to outside of the slider member 11 through the lateral surface 11b of the slider member 11.

So, with the present head slider 10, there is no necessity of forming the through-hole 108 for burial of the terminal 107 in the slider 102, as in the conventional device, so that it is possible to evade the problem of the through-hole 103 conflicting with optical components, such as the optical fiber 104 or the polarizing mirror 105. Moreover, there is no necessity of boring a hole in the slider member 102 using e.g., a diamond drill or an ultrasonic machining device described above.

So, the head slider 10, constructed as described above, is easy to manufacture and can be reduced in size. That is, with the present head slider, signal recording and/or reproduction on or from the magneto-optical disc can be achieved satisfactorily, thus assuring sufficient reliability.

A typical manufacturing method for the above-described head slider 10 is now explained in detail.

Figure 7:
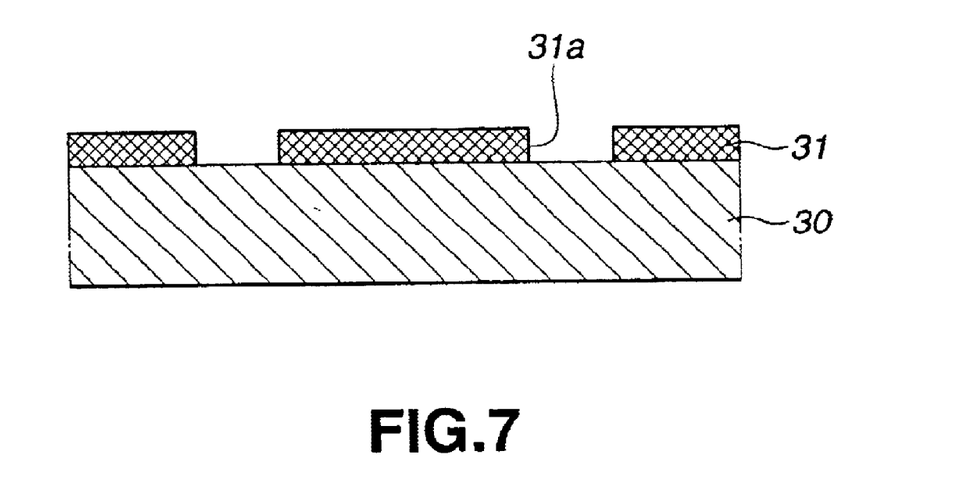
FIG. 7 shows a process for forming a terminal for connection to outside, in which the state of forming a resist mask on a substrate is shown.

For manufacturing the head slider 10, a substrate 30 formed e.g., of altic ($Al_2O_3TiC$) is provided, as shown in FIG. 7. This substrate 30 ultimately proves the aforementioned slider member 11. This substrate is ultimately sliced to produce plural head sliders 10 in a lump.

The substrate 30 then is bored at pre-set locations in register with the respective slider members 11 to form the aforementioned through-holes 13. The surface 11a of the slider member 11 facing the magneto-optical disc 4 is then etched to form an air lubricating surface.

The terminal for connection to outside 17, shown in FIG. 5, is formed at a pre-set location on the substrate 30 in register with each slider member 11.

In forming this terminal for connection to outside 17, a sheet resist is affixed to the entire major surface of the substrate 30 which later proves the surface 11a facing the magneto-optical disc 4. A mask formed with plural openings in register with the terminals for connection to outside 17 is applied and exposed to light. The portions of the sheet resist exposed to light are dissolved with a developing solution and removed to complete a resist mask 31 having plural openings 31a at pre-set locations on the substrate 30. Preferably, the resist mask 31 is sufficiently dried and baked by being heated at approximately 80° C. to improve durability and adhesion to the substrate 30.

Figure 8:
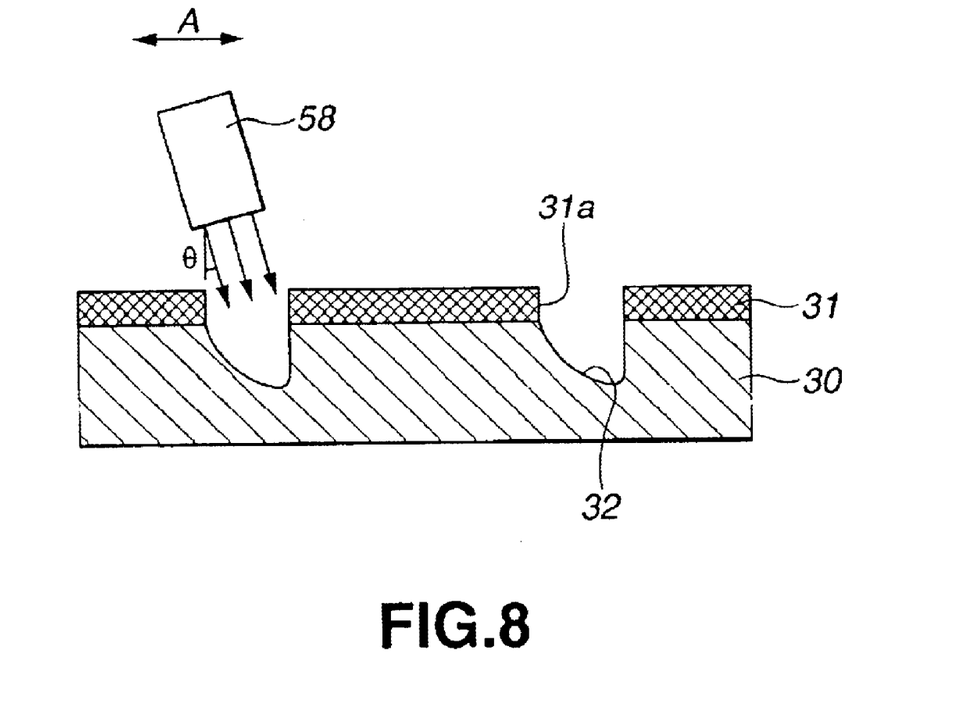
FIG. 8 shows a process for forming a terminal for connection to outside, in which the state of forming a groove having a bottom surface inclined in the depth-wise direction in the substrate.

A jet stream obtained on dispersing an polishing agent in compressed air is then ejected at a pre-set angle to the surface of the substrate 30 carrying the resist mask 31 by way of etching to form a groove 32 having a bottom surface inclined in the depth-wise direction, as shown in FIG. 8. The groove 32, formed in the substrate 30, ultimately proves the terminal groove 19 formed in the slider member 11.

Figure 9:
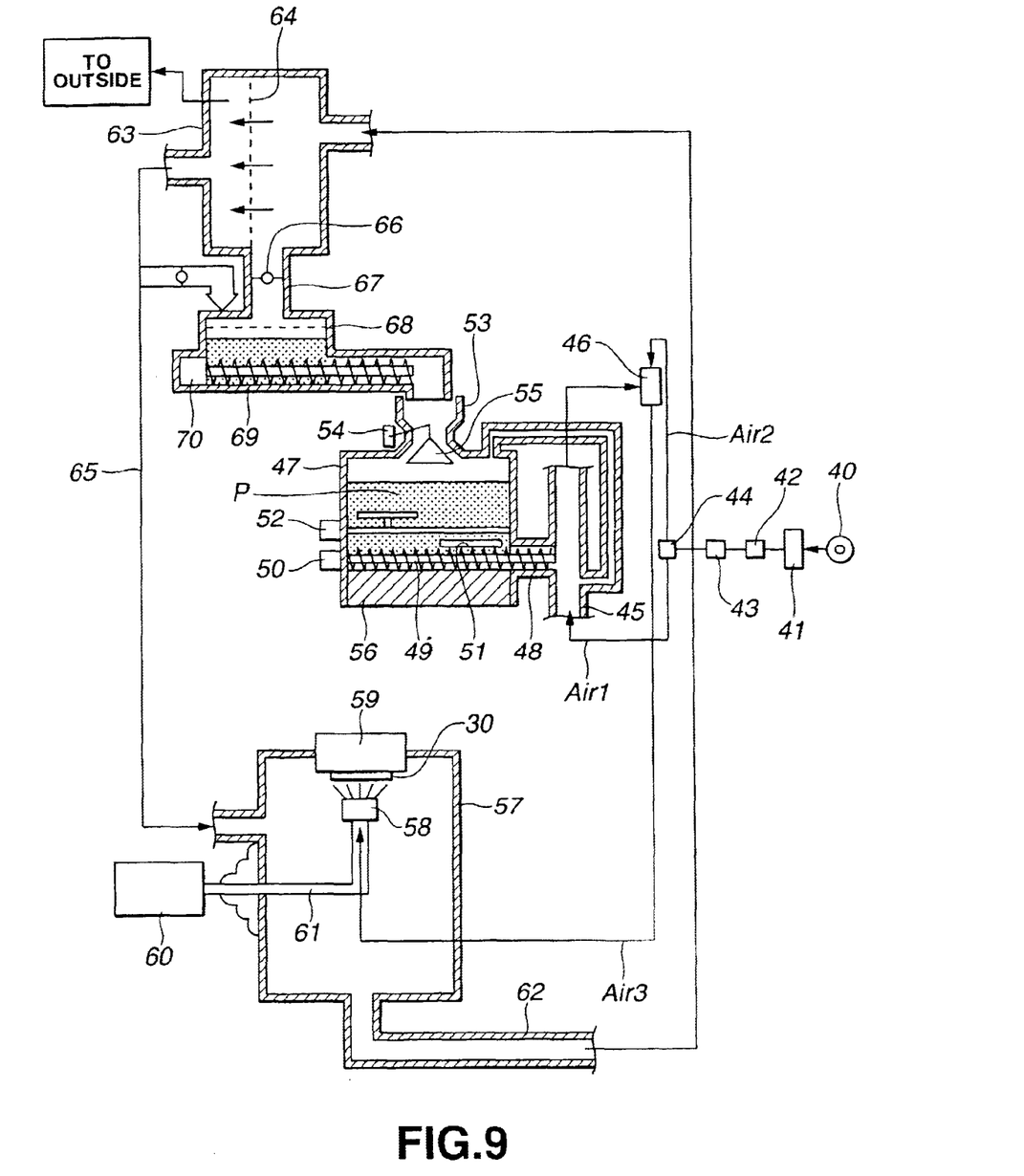
FIG. 9 is a cross-sectional view for illustrating the structure of a powder beam machining device.

FIG. 9 shows a typical powder beam machining device used in forming this groove 32 in the substrate 30.

In this powder beam machining device, high-pressure air Air, supplied from an air source 40, is dried in a drying unit 41 and fed to a branching unit 44 through a flow sensor 42 and a flow controller 43. One of fractional high-pressure air, referred to below as the first branched high pressure air Air1, thus produced, is passed to a dispersion chamber 45, whilst the remaining fractional high-pressure air, referred to below as the second branched high pressure air Air2, is passed to an ejector 46.

The dispersion chamber 45 is connected through a connecting unit 48 to a mixing tank 47 filled with the polishing agent P. From this mixing tank 47, the polishing agent P is furnished through the connecting unit 48.

In more detail, a screw 49 is provided in the inside of the mixing tank 47 for feeding out the polishing agent P into the dispersion chamber 45. The screw 49 is provided with a spirally extending groove on its outer peripheral surface, so that, when the screw is rotationally driven by a motor 50 secured to the mixing tank 47, the polishing agent P intruded into the groove is sent out through the connecting unit 48 into the dispersion chamber 45. That is, in the mixing tank 47, an amount of the polishing agent P corresponding to the rotation of the screw 49 is sent out into the dispersion chamber 45.

Within the mixing tank 47, there is provided an agitation frame 51 for agitating the polishing agent P. Moreover, since the agitation frame 51 is run in rotation by the motor 52 secured to the mixing tank 47, the agitation frame 51 is interlocked to the screw 49 as it furnishes the polishing agent P into the groove of the screw 49.

The upper portion of the mixing tank 47 is provided with an opening 53, through which the polishing agent P is returned, and a triangular valve 55 adapted to be uplifted and lowered under the driving power of a driving mechanism 54 to open or close the opening 53. The bottom portion of the mixing tank 47 is provided with an electronic balance 56 for measuring the weight of the polishing agent P.

Thus, with the present powder beam machining device, the opening 53 of the mixing tank 47 can be opened/closed by the triangular valve 55, so that a constant amount of the polishing agent P can be sent out into the dispersion chamber 45 as the weight of the polishing agent P in the mixing tank 47 is measured accurately by the electronic balance 56.

The polishing agent P, sent out into the dispersion chamber 45, is blown up by the first branched high pressure air Air 1 flowing through the dispersion chamber 45 so as to be sent out into the ejector 46 in a state in which the polishing agent P is dispersed in the first branched high pressure air Air 1. The ejector 46 mixes the polishing agent P sent out from the dispersion chamber 45 with the second branched high pressure air Air 2 to generate a solid-air bi-phase stream Air 3 to route the so-generated solid-air bi-phase stream Air 3 under pressure into an ejection nozzle 58 provided in a machining chamber 57.

In the machining chamber 57, there is provided, facing the ejection nozzle 58, a work 59 on which to install the aforementioned substrate 30. On this substrate 30, placed on the work 59, the solid-air bi-phase stream Air 3 is ejected from the ejection nozzle 58 to effect the etching by the polishing agent P dispersed in the solid-air bi-phase stream Air 3.

The ejection nozzle 58 is provided to the distal end of an arm 61 connected to an XY stage 60 and is movable in the horizontal direction by a force of propulsion imparted from the XY stage 60 through the arm 61. The ejection nozzle 58 may have the blowing angle of the solid-air bi-phase stream Air 3 adjusted freely with respect to the substrate 30 provided on the work 59.

The solid-air bi-phase stream Air 3 ejected from the ejection nozzle 58 is sent out through a piping 62 into a separation chamber 63. This separation chamber 63 is provided with a primary filter 64 through which part of the solid-air bi-phase stream Air 3 is filtered and sent back through a piping 65 into the machining chamber 57. The remaining portion of the solid-air bi-phase stream Air 3 is filtered through a secondary filter as a hepa-filter so as to be ejected to outside.

The polishing agent P, recovered by the primary filter 64, is sent back into a reservoir chamber 68 through a connecting portion 67 that can be opened/closed by a butterfly valve 66. Within this reservoir chamber 68 is mounted a screw 69 which is rotationally driven by a motor 70 secured to the reservoir chamber 68 to feed out the polishing agent P towards the opening 53 of the mixing tank 47.

In the present powder beam machining device, as described above, the polishing agent P dispersed in the solid-air bi-phase stream Air 3 can be returned to the mixing tank 47 through the machining chamber 57, separating chamber 63 and the reservoir chamber 68 in this order. In the present powder beam machining device, the polishing agent P can be re-used in this manner efficiently.

In the present embodiment, the above-described powder beam machining device is used for machining by etching. That is, in the present embodiment, the solid-air bi-phase stream Air 3 is ejected at a pre-set angle from the ejection nozzle 58 onto the substrate 30 to effect etching by the polishing agent P entrained in the solid-air bi-phase stream Air 3. As the ejection nozzle 58 is scanned in the direction indicated by arrow A in FIG. 8, that is in a direction perpendicular to the cutting direction of the substrate 30, it is fed in pitch. This operation is sequentially repeated as it is further scanned to etch the entire surface of the substrate 30 carrying the resist mask 31.

In order to prevent chipping, that is breakage, of the groove 32 formed, the force of impact of the solid-air bi-phase stream Air 3 ejected from the ejection nozzle 58 against the substrate 30 is desirably as small as possible.

To this end, the ejection opening of the ejection nozzle 58 is preferably of a rectangular profile with the length of the short side being 0.3 mm or longer and with the length of the long side being five or more times the length of the short side, for example, 10 to 50 mm. On the other hand, the depth of the ejection nozzle 58 (slit) is desirably twenty times the length of the short side. The polishing agent P used is preferably GC#600 to GC#1500.

The ejection nozzle 58 is preferably so designed that the blowing angle è of the solid-air bi-phase stream Air 3 will be 10° to 30° relative to the surface of the substrate 30, as shown in FIG. 8.

In this manner, the groove 32 having a bottom surface which is inclined in the depth-wise direction can be formed in a surface area of the substrate 30 faced by an opening 31a of the resist mask 31. That is, this groove 32 can be formed to have a bottom surface inclined in the depth-wise direction and a lateral wall upstanding from this bottom surface.

Here, etching processing was carried out with the air flow of 50 Nl/min and with the scanning speed of 100 mm/sec, using e.g., GC#600 as the polishing agent. The etching processing was finished at a time point when the deepest point of the groove 32 formed was approximately 250 µm deep.

Figure 10:
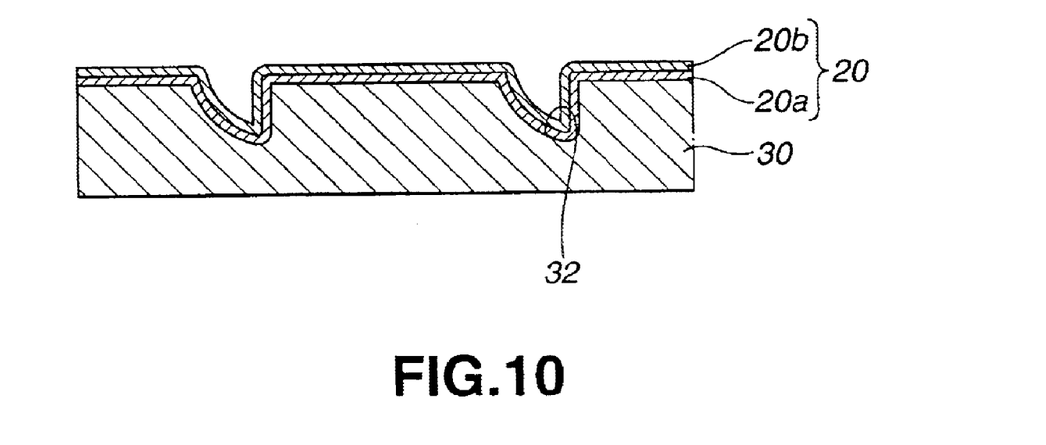
FIG. 10 shows the step of forming a terminal for connection to outside, in which the state of forming an underlying layer on a substrate having a groove is shown.

The resist mask 31, formed on the substrate 30, was dissolved and removed, as shown in FIG. 10. After the substrate 30 was washed and subsequently dried, a layer of chromium 20a, about 20 nm in thickness, and a layer of copper 20b, about 2 µm in thickness, which later prove the underlying layer 20, were formed in this order on he entire surface of the substrate 30 by sputtering.

Figure 11:
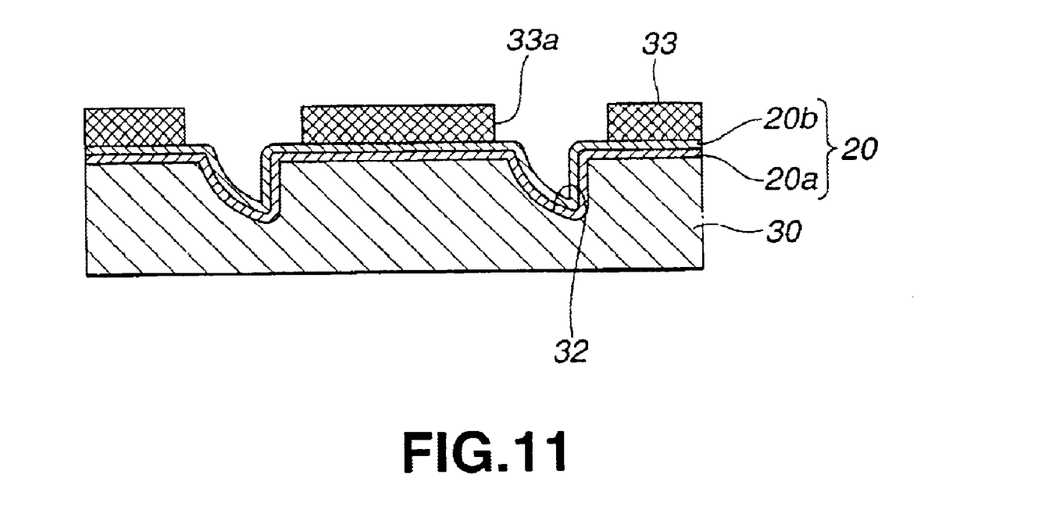
FIG. 11 is a schematic cross-sectional view showing the step of forming a terminal for connection to outside, in which the state of forming a resist mask on a substrate having the underlying layer 20 formed thereon is shown.

After a sheet resist was bonded to the entire surface of the substrate surface carrying the underlying layer 20, a mask having plural openings slightly larger than the openings in the terminals for connection to outside 17 is applied thereon and exposed to light, as shown in FIG. 11. The sheet resist potions, thus exposed to light, are dissolved with a developing solution to form a resist mask 33 having plural openings 33a in register with the grooves 32 in the substrate 30. The openings 33a are slightly larger in size than the grooves 32. Preferably, the resist mask 33 is sufficiently dried and then baked by being heated to approximately 80° C. for improving the adhesion to the underlying layer 20 and the durability.

Figure 12:
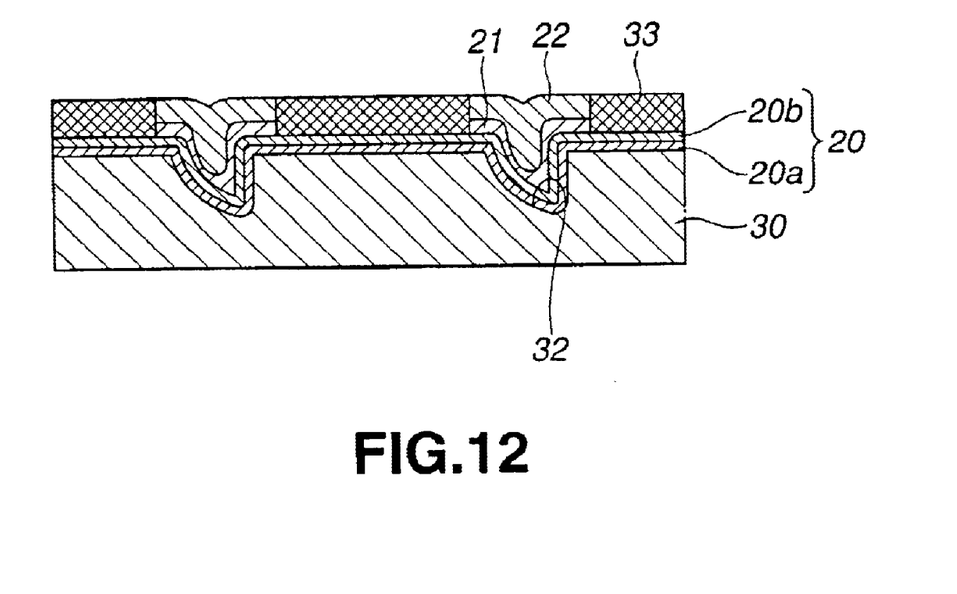
FIG. 12 is a schematic cross-sectional view showing the step of forming a terminal for connection to outside, in which the state of sequentially layering gold and copper by an electroplating method.

Then, as shown in FIG. 12, on a surface of the substrate 30 looking from the openings 33a of the resist mask 33, that is on a surface of the substrate 30 looking from the grooves 32 carrying the underlying layer 20, the gold layer 21 approximately 50 µm thick and the copper layer 22 approximately 230 µm thick, slightly thicker than the depth of 250 µm of the groove 32, are subsequently layered by an electroplating method.

Figure 13:
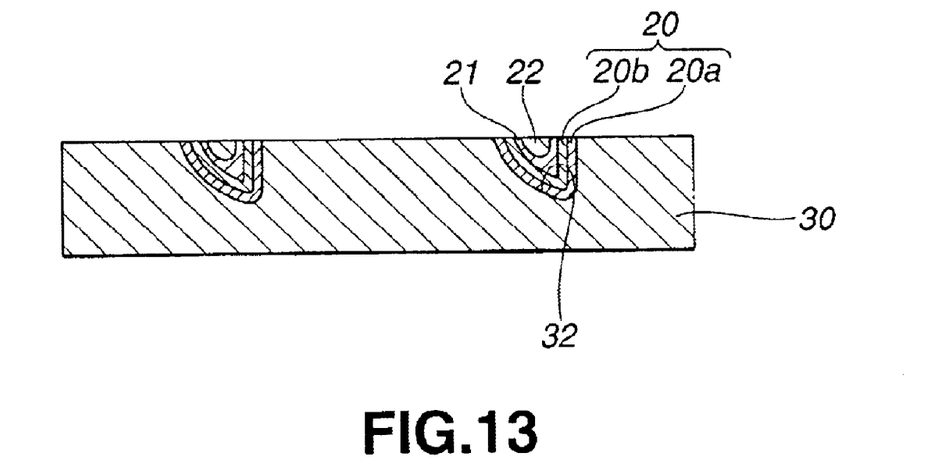
FIG. 13 is a schematic cross-sectional view showing the step of forming a terminal for connection to outside, in which the state of grinding the substrate surface is shown.

The resist mask 33, formed on the underlying layer 20 of the substrate 30, is dissolved and removed, as shown in FIG. 13. The substrate 30 then is rinsed and dried. The substrate 30 then is planarized by polishing to a level of the substrate surface.

The lead-out conductor 18 is embedded at the sites in register with the respective slider members 11 of the substrate 30. The thin-film coil 16, connected to the lead-out conductor 18 at the inner peripheral sites, are formed as thin film. This thin-film coil 16 has a pair of lead-out portions 16a, led out towards the air effluent side of the slider members 11, as described above, so that the outer peripheral ends and the lead-out conductor 18 are led out through the lead-out portion 16a to the air effluent side of the slider members 11. In this manner, the thin-film coil 16 is electrically connected to the gold 21 charged into the inside of the groove 32 in the substrate 30 through the lead-out portion 16a.

Figure 14:
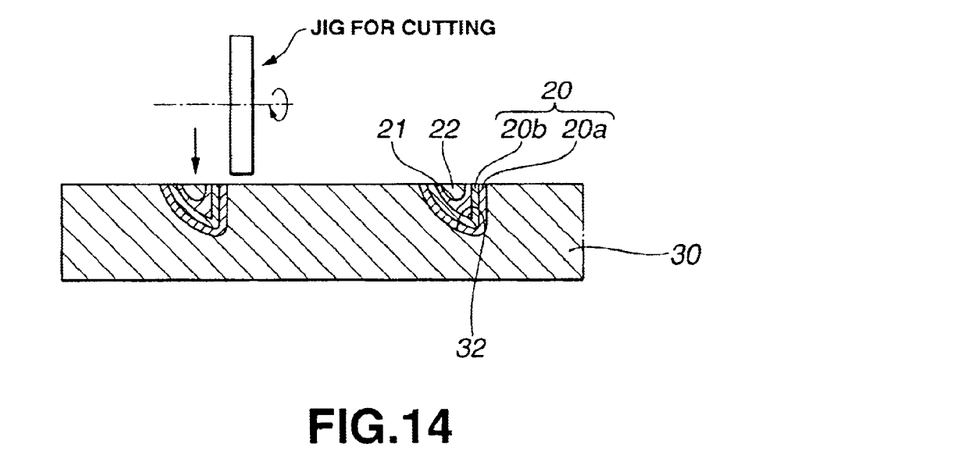
FIG. 14 is a schematic cross-sectional view showing the step of forming a terminal for connection to outside, in which the state of cutting a substrate is shown in more detail.
Figure 15:
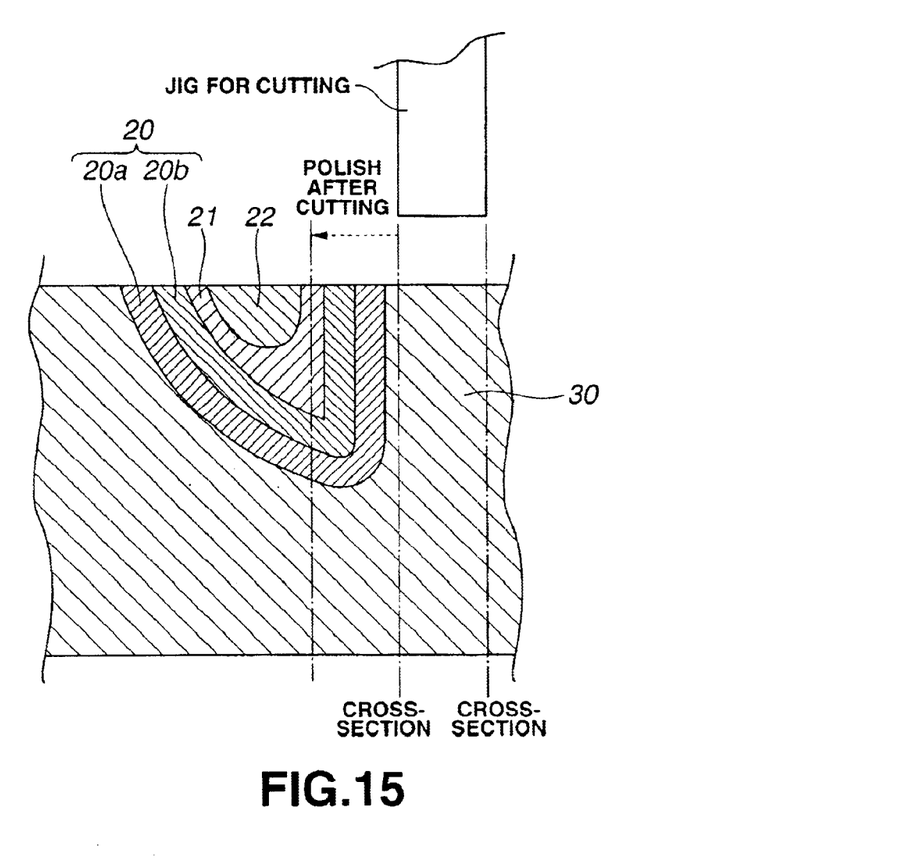
FIG. 15 is an enlarged schematic cross-sectional view showing the step of forming a terminal for connection to outside, in which the state of cutting a substrate in another form is shown.

The substrate 30 then is cut in the vicinity of the groove 32, that is along the lateral wall section of the groove 32, for fractionation into respective slider members 11. The end face of the slider member 11, thus cut, is then ground until the gold portion 21 is exposed, as shown in FIG. 15. This completes the terminal for connection to outside 17 comprised of an electrically conductive material charged in the inside of the terminal groove 19.

That is, this terminal for connection to outside 17 is formed so as to have a multi-layered structure comprised of the underlying layer 20 of the chromium 20a and the copper 20b, layered in this order, in the inside of the terminal groove 19, and the gold 21 and the copper 22, layered in this order on the underlying layer 20, with the gold 21 being exposed to outside the slider member 11 from its lateral surface 11b. Thus, the gold portion 21 is exposed at the end 17a of the terminal for connection to outside 17.

To the end 17a of the terminal for connection to outside 17 is connected a wire similarly of gold by e.g., wire bonding. This enables the current for generating the magnetic field to be furnished to the thin-film coil 16.

Although the terminal for connection to outside 17 has a multi-layered structure, composed of gold and other metals, this structure is not limitative. For example, such a structure may be used in which only gold 21 is charged by an electroplating method on the underlying layer 20 formed by sequentially layering the chromium 20a and the copper 20b, as shown for example in FIG. 6.

However, since the plating speed for copper 22 is about six times as fast as that for gold 21, it is desirable in forming the terminal for connection to outside 17 to deposit gold 21 and copper 22 sequentially on the underlying layer 20 as shown in FIG. 5, with the gold 21 facing to outside the slider member 11 from the lateral surface 11b of the slider member 11.

By so doing, the machining time can be shorter significantly as compared to the case in which only gold 21 is charged on the underlying layer 20 shown in FIG. 6. Moreover, if the terminal for connection to outside 17 is formed by the above-described process, the gold 21 can be formed to face to outside the slider member 11 from the lateral surface 11b of the slider member 11. That is, the gold portion 21 can be exposed easily from the end 17a of the terminal for connection to outside 17.

By arranging the optical lens 12, optical fiber 14 and the polarizing mirror 15 at pre-set locations on each slider member 11, thus prepared, it is possible to fabricate the head slider 10 shown in FIG. 3 in a lump.

In the above-described head slider 10, the terminal for connection to outside 17 is formed by charging electrically conductive materials in the terminal groove 19 formed so as to be opened in the surface 11a and the lateral surface 11b of the slider member 11, with the surface 11a being a facing surface to the magneto-optical disc 4. The terminal for connection to outside 17 is electrically connected to the thin-film coil 16 through the lead-out portion 16a, with the end 17a of the terminal for connection to outside 17 facing to outside the slider member 11 from the lateral surface of the slider member 11.

In this case, the groove 32 formed in the substrate 30 is higher in reproducibility than if the slider member 102 is bored using a diamond drill or ultrasonic machining, with the result that the terminal groove 19 can be formed highly precisely in the slider member 11.

By fabricating the head slider 10 through the above process, the head slider 10, miniaturized in size, can be produced highly precisely by a simplified method. Moreover, since this manufacturing method enables the head sliders 10 of stable quality to be produced in a lump operation in large quantities, the manufacturing cost can be reduced significantly.

So, if the head slider 10 is produced by the above process, the small-sized head slider 10 can be produced highly precisely by a simplified process. Moreover, since the head sliders 10 of stabilized quality can be produced in a lump in large quantities, the production cost can be lowered.

The present invention can be applied to an apparatus for recording and/or reproducing signals by exploiting the proximity field light, termed near-field recording, as the head slider is floated a small distance from the signal recording surface of the magneto-optical disc.

Figure 16:
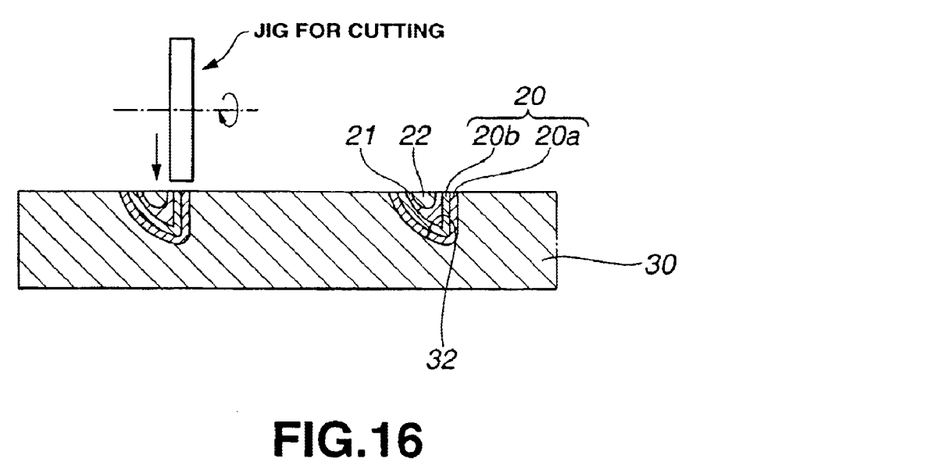
FIG. 16 is a schematic cross-sectional view showing the step of forming a terminal for connection to outside, in which the state of cutting a substrate in another form is shown in more detail.
Figure 17:
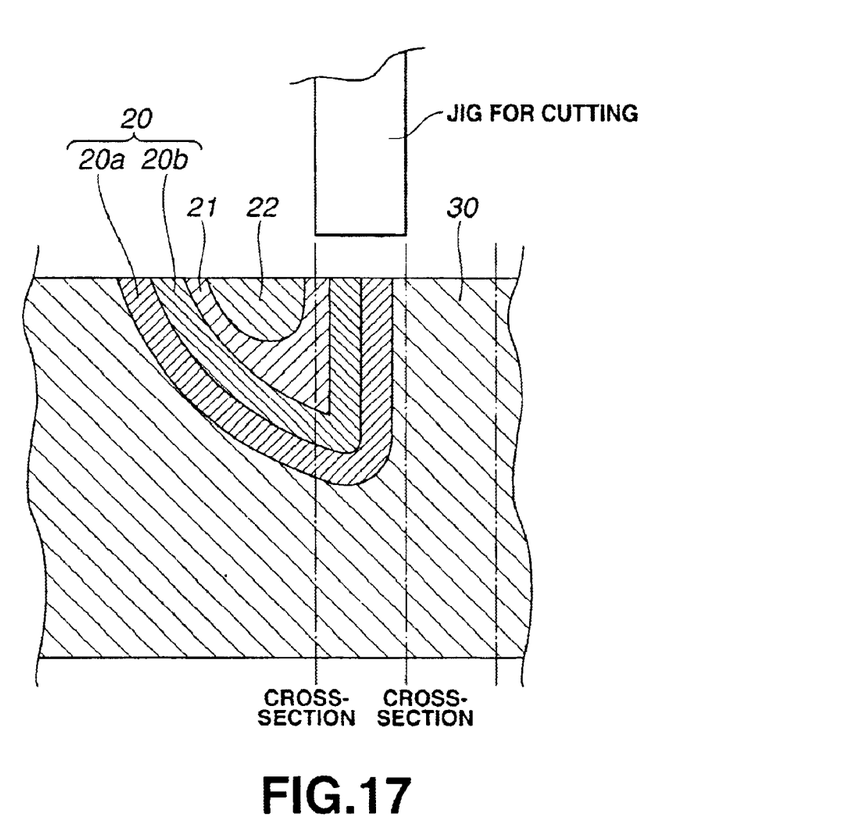
FIG. 17 is an enlarged schematic cross-sectional view showing the step of forming a terminal for connection to outside, in which the state of cutting a substrate in still another form is shown.

In the process of cutting the substrate 30 into respective slider members 11 by cutting in the vicinity of the groove 32, as shown in FIG. 16, such fractionation may be performed at the gold portion 21, in which case the gold portion 21 is exposed, without grinding, in the completed state of the cutting, as shown in FIG. 17. This forms the terminal for connection to outside 17 having the electrically conductive material charged in the inside of the terminal groove 19, as shown in FIG. 5.

It is to be noted that the present invention can be applied to devices other than the device described above by way of illustration. For example, the present invention can be applied to a device for recording and/or reproducing signals using a proximity field light termed near-field recording as the head slider is floated with a small distance over the signal recording surface of the magneto-optical disc.

What is claimed is:

1. A method for producing a slider for an optical head, including a slider member adapted for floating and running over a recording medium during recording and/or reproduction of information signals for said recording medium, an optical lens bonded to said slider member and a magnetic field generating means provided on a surface of said slider member carrying said optical lens facing said recording medium; said method comprising:

a first step of forming a groove presenting a bottom surface inclined in the depth-wise direction by ejecting a jet comprised of a polishing agent dispersed in a compressed gas on a substrate which proves said slider member;

a second step of charging an electrically conductive material, which proves a terminal electrically connected to said magnetic field generating means, in the inside of said groove formed in said substrate wherein a plurality of metal materials at least including gold are charged as the metal materials are layered sequentially; and a third step of cutting said substrate in the vicinity of an end of said groove to form a plurality of individual slider members wherein, said substrate is cut in the vicinity of the end of said groove into individual slider members; and wherein the sectional surface of said slider member as cut is ground until the gold portion is exposed.

2. The method for producing a slider for an optical head according to claim 1 wherein, in said first step, the jet comprised of the polishing agent dispersed in the compressed gas is ejected at an angle of 10 to 30 to the surface of said substrate.

3. The method for producing a slider for an optical head according to claim 1 wherein, in said second step, the electrically conductive material is charged by a plating method into the inside of a groove formed in said substrate.

* * * * *